United States Patent
Arikita et al.

(10) Patent No.: US 11,158,316 B2
(45) Date of Patent: Oct. 26, 2021

(54) IN-VEHICLE DEVICE AND SPEECH RECOGNITION METHOD

(71) Applicant: ALPINE ELECTRONICS, INC., Tokyo (JP)

(72) Inventors: Tomohiro Arikita, Tokyo (JP); Masaaki Ohira, Tokyo (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 219 days.

(21) Appl. No.: 16/558,642

(22) Filed: Sep. 3, 2019

(65) Prior Publication Data

US 2020/0160862 A1 May 21, 2020

(30) Foreign Application Priority Data

Nov. 16, 2018 (JP) .............................. JP2018-215467

(51) Int. Cl.
 *G10L 15/22* (2006.01)
 *G10L 15/08* (2006.01)

(52) U.S. Cl.
 CPC .............. *G10L 15/22* (2013.01); *G10L 15/08* (2013.01); *G10L 2015/088* (2013.01); *G10L 2015/223* (2013.01)

(58) Field of Classification Search
 CPC ......... G10L 15/22; G10L 15/00; G10L 15/07; G10L 15/06; G10L 15/08; G10L 15/10; G10L 15/18; G10L 15/183; G10L 15/20; G10L 15/26; G10L 15/28; G10L 2015/223; G10L 2015/22; G10L 2015/00; G10L 2015/06; G10L 2015/08; G10L 2015/081; G10L 2015/221; G10L 2015/228

(Continued)

(56) References Cited

U.S. PATENT DOCUMENTS

2013/0132094 A1  5/2013  Lim
2014/0278435 A1* 9/2014  Ganong, III ............ G10L 15/22
                                                 704/275

(Continued)

FOREIGN PATENT DOCUMENTS

| EP | 3040985 | 7/2016 |
| JP | 2000322078 | 11/2000 |
| WO | 2013/097075 | 7/2013 |

OTHER PUBLICATIONS

Extended European Search Report for 19208858.1 dated Mar. 16, 2020.

*Primary Examiner* — Qi Han (74) *Attorney, Agent, or Firm* — IPUSA, PLLC (57) ABSTRACT

An in-vehicle device includes: a first speech recognition unit configured to recognize a word indicating the in-vehicle device and a word indicating a first instruction type by speech recognition, from first voice data input to the in-vehicle device, the first instruction type being one of instruction types for operating the in-vehicle device; and a second speech recognition unit configured, in response to the word indicating the in-vehicle device being recognized from the first voice data by the first speech recognition unit, to recognize a word indicating a second instruction type by speech recognition, from second voice data input to the in-vehicle device, the second voice data being input after the first voice data, and the second instruction type being one of the instruction types for operating the in-vehicle device.

3 Claims, 9 Drawing Sheets

(58) Field of Classification Search
USPC .... 704/275, 270.1, 270, 231, 233, 243, 245,
704/246, 250, 251, 255
See application file for complete search history.

(56) References Cited

U.S. PATENT DOCUMENTS

| | | |
|---|---|---|
| 2015/0235642 A1 | 8/2015 | Nishikawa et al. |
| 2018/0173494 A1* | 6/2018 | Choi ........................ G10L 15/30 |
| 2019/0035398 A1* | 1/2019 | Choi ........................ G10L 15/22 |

* cited by examiner

| TRIGGER WORD | AV OPERATION WORDS |
|---|---|
| X | ·STOP AV<br>·START AV<br>⋮ |

IN-VEHICLE DEVICE AND SPEECH RECOGNITION METHOD

CROSS-REFERENCE TO RELATED APPLICATIONS

This patent application is based on and claims priority to Japanese Patent Application No. 2018-215467 filed on Nov. 16, 2018, the entire contents of which are incorporated herein by reference.

BACKGROUND OF THE INVENTION

1. Field of the Invention

The present invention relates to an in-vehicle device and a speech recognition method.

2. Description of the Related Art

Conventionally, an in-vehicle device capable of operating based on a voice instruction (for example, an on-board audiovisual device equipped with a speech recognition function) is known. In such an in-vehicle device, speech recognition is performed by combining a speech recognition function embedded in the in-vehicle device with a cloud-based speech recognition function.

Specifically, the in-vehicle device detects a trigger word (e.g., a word for calling an in-vehicle device to be directed by a voice instruction) by using the embedded speech recognition function, and an instruction type indicated by a voice command following the trigger word is recognized using the cloud-based speech recognition function. According to such an in-vehicle device, because the cloud-based speech recognition function can be operated by detecting a trigger word, instruction types of various voice commands following the trigger word can be accurately recognized.

On the other hand, in a case in which an in-vehicle device is configured such that a trigger word must always be spoken before a voice command is issued, as in the above-described in-vehicle device, the superiority of a voice command, in terms of high convenience as compared to an operation by hands and the like, is impaired.

CITATION LIST

Patent Document

[Patent Document 1] Japanese Laid-Open Patent Publication No. 2000-322078

SUMMARY OF THE INVENTION

The present invention was made in light of the above-described problems, and is intended to improve convenience when issuing a voice instruction to the in-vehicle device.

An in-vehicle device according to one aspect of the present disclosure includes: a first speech recognition unit configured to recognize a word indicating the in-vehicle device and a word indicating a first instruction type by speech recognition, from first voice data input to the in-vehicle device, the first instruction type being one of commands for operating the in-vehicle device; and a second speech recognition unit configured, in response to the word indicating the in-vehicle device being recognized from the first voice data by the first speech recognition unit, to recognize a word indicating a second instruction type by speech recognition, from second voice data input to the in-vehicle device, the second voice data being input after the first voice data, and the second instruction type being one of the commands for operating the in-vehicle device. The first speech recognition unit is capable of recognizing the word indicating the first instruction type, regardless of whether or not the word indicating the in-vehicle device is recognized from the first voice data by the first speech recognition unit.

DETAILED DESCRIPTION OF EMBODIMENTS

Hereinafter, embodiments will be described with reference to the accompanying drawings. In the present specification and drawings, elements having substantially identical features are given the same reference symbols and overlapping descriptions may be omitted.

First Embodiment

<Example of Arrangement of On-Board Audiovisual Equipment>

Figure 1:
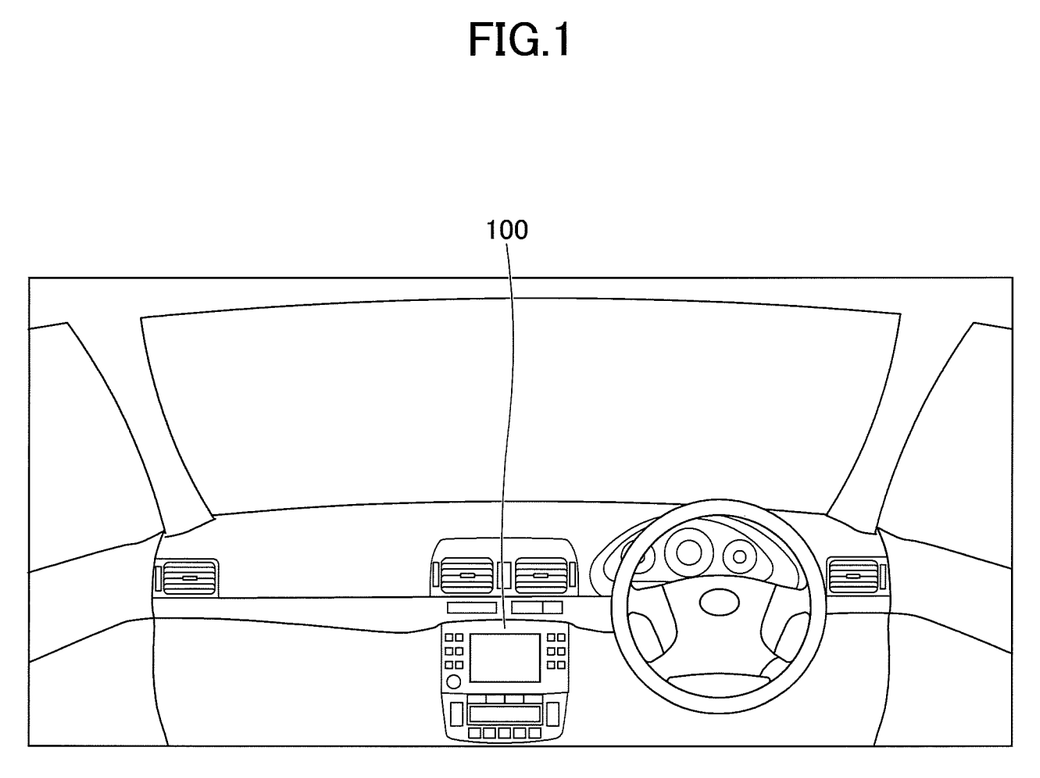
FIG. 1 is a diagram illustrating an example of an arrangement of an in-vehicle audiovisual device.

First, an example of an arrangement of an on-board audiovisual device, which is an example of an in-vehicle device, will be described. FIG. 1 is a diagram illustrating an example of an arrangement of an on-board audiovisual device according to a first embodiment. As illustrated in FIG. 1, the on-board audiovisual device 100 is disposed, for example, in a center console in an interior of a vehicle. According to such an arrangement, an occupant of the vehicle can operate the on-board audiovisual device 100 with his/her hand or by a voice instruction.

It should be noted that an audiovisual data playback program is installed in the on-board audiovisual device 100. When the program is executed, the on-board audiovisual device 100 performs an operation (such as a playback of various audiovisual data, or stopping of playback) in response to an operation by occupant's hand or by occupant's voice command.

<Hardware Configuration of On-Board Audiovisual Equipment>

Figure 2:
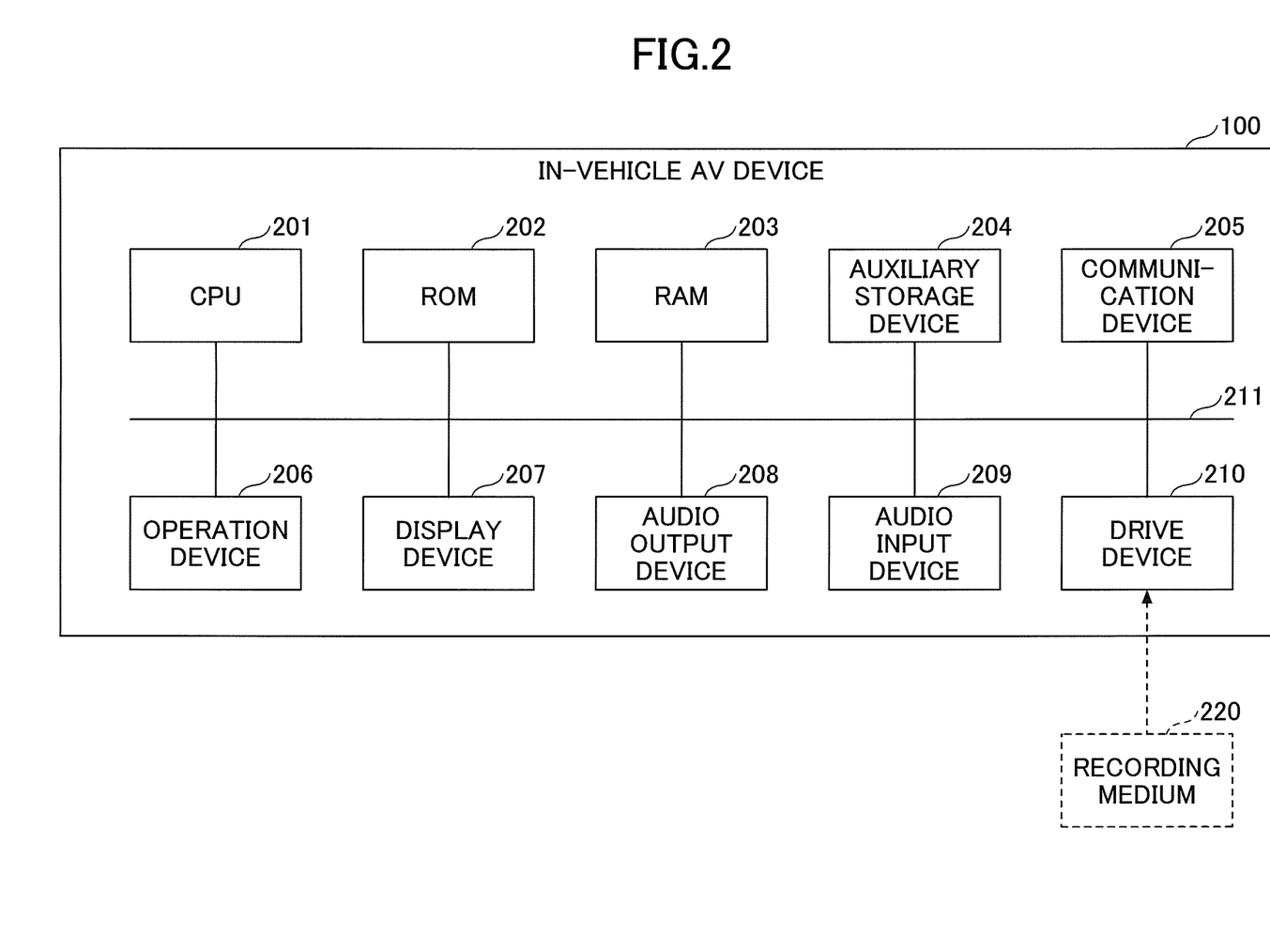
FIG. 2 is a diagram illustrating an example of a hardware configuration of the in-vehicle audiovisual device.

Next, the hardware configuration of the on-board audiovisual device 100 will be described. FIG. 2 is a diagram illustrating an example of a hardware configuration of the on-board audiovisual device. As illustrated in FIG. 2, the on-board audiovisual device 100 includes a CPU (Central Processing Unit) 201, a ROM (Read Only Memory) 202, and a RAM (Random Access Memory) 203. The CPU 201, ROM 202, and RAM 203 configure what may be termed as a computer.

The on-board audiovisual device 100 also includes an auxiliary storage device 204, a communication device 205, an operation device 206, a display device 207, an audio output device 208, an audio input device 209, and a drive device 210. Each of these hardware elements of the on-board audiovisual device 100 is interconnected via a bus 211.

The CPU 201 is an arithmetic operating device that executes various programs (such as the audiovisual data playback program) installed in the auxiliary storage device 204.

The ROM 202 is a non-volatile memory. The ROM 202 functions as a memory device for storing programs, data, and the like, which are necessary for the CPU 201 executing the various programs installed in the auxiliary storage device 204. Specifically, the ROM 202 functions as a memory device for storing a boot program such as BIOS (Basic Input/Output System) or EFI (Extensible Firmware Interface).

The RAM 203 is a volatile memory such as a DRAM (Dynamic Random Access Memory) and an SRAM (Static Random Access Memory). The RAM 203 functions as a main memory device providing a work area deployed when the various programs installed in the auxiliary storage device 204 are executed by the CPU 201.

The auxiliary storage device 204 is an auxiliary storage device that stores the various programs, various audiovisual data played back by executing various programs, and data (words) used for executing the various programs. For example, a word information storing unit to be described below, which is an example of a storage unit, is embodied by the auxiliary storage device 204.

The communication device 205 is a communication device that is used for communicating with an external network. The on-board audiovisual device 100 communicates with a cloud computing platform on a network via the communication device 205.

The operation device 206 is an operation device (such as a touch panel or various operation buttons) that accepts an operation by hand of a vehicle occupant to the on-board audiovisual device 100. The display device 207 is a display device that displays audiovisual data (image data).

The audio output device 208 is an audio output device such as a speaker that outputs audio data as sound. The audio input device 209 is an input device such as a microphone that detects voice when a vehicle occupant speaks and that generates voice data.

The drive device 210 is a device to which a recording medium 220 is set. An examples of the recording medium 220 mentioned here include a medium that records information optically, electrically, or magnetically, such as a CD-ROM, a flexible disk, or a magneto optical disk. An example of the recording medium 220 may also include a semiconductor memory which records information electrically, such as a ROM or a flash memory.

The above-described various programs to be installed in the auxiliary storage device 204 are installed, for example, by loading a recording medium 220, which is distributed, into the drive device 210, and by the various programs recorded in the recording medium 220 being read out by the drive device 210. Alternatively, the various programs to be installed in the auxiliary storage device 204 may be installed by downloading the various programs from a network via the communication device 205.

<Functional Configuration of On-Board Audiovisual Device>

Figure 3:
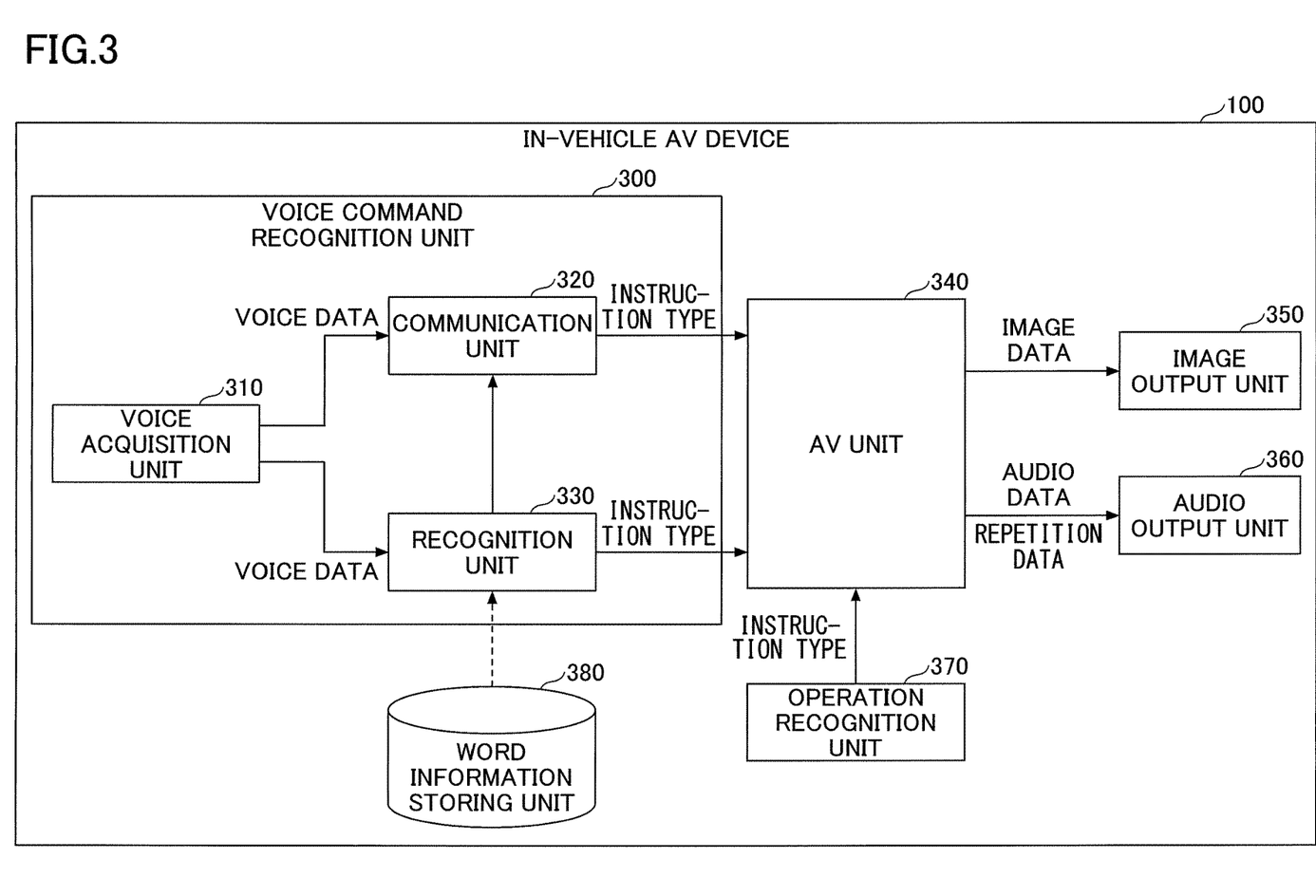
FIG. 3 is a first diagram illustrating an example of a functional configuration of the in-vehicle audiovisual device.

Next, a functional configuration of the on-board audiovisual device 100 will be described. FIG. 3 is a first diagram illustrating an example of the functional configuration of the on-board audiovisual device. As described above, the audiovisual data playback program is installed in the on-board audiovisual device 100. By the program being executed by the on-board audiovisual device 100, the on-board audiovisual device 100 functions as a voice command recognition unit 300, an AV unit 340, an image output unit 350, an audio output unit 360, and an operation recognition unit 370.

The voice command recognition unit 300 recognizes a word indicating an instruction type of a voice command of the occupant of the vehicle, based on voice data obtained from the audio input device 209, and transmits the instruction type to the AV unit 340. Specifically, the voice command recognition unit 300 includes a voice acquisition unit 310, a communication unit 320, and a recognition unit 330.

The voice acquisition unit 310 acquires voice data from the audio input device 209, and transmits the voice data to the communication unit 320 and the recognition unit 330.

The communication unit 320 is an example of a second speech recognition unit. When an operation command is received from the recognition unit 330, the communication unit 320 transmits voice data of a predetermined length, which is received from the voice acquisition unit 310 after the reception of the operation command, to the cloud computing platform on the network. The voice data of the predetermined length, for example, refers to voice data of a predetermined period, or voice data of one phrase. When a result (instruction type) of speech recognition is received from the cloud computing platform on the network in response to the transmission of the voice data, the communication unit 320 transmits the instruction type (second instruction type) to the AV unit 340.

The recognition unit 330 is an example of a first speech recognition unit. The recognition unit 330 reads out (retrieves) words stored in the word information storing unit 380, and translates, by performing a speech recognition process, the voice data received from the voice acquisition unit 310 to word(s), in order to determine whether or not the voice data received from the voice acquisition unit 310 matches one of the words that have been read out from the word information storing unit 380. In addition, if the word(s) obtained by performing the speech recognition process corresponds to word(s) indicating the on-board audiovisual device 100 to be operated by the voice command, the recognition unit 330 transmits, to the communication unit 320, an operation instruction for executing the cloud-based voice recognition function.

In contrast, if the word(s) obtained by performing the speech recognition process corresponds to word(s) indicating a first instruction type for operating the on-board audiovisual device 100 to be operated by the voice command, the recognition unit 330 transmits the first instruction type to the AV unit 340.

The operation recognition unit 370 recognizes an operation by hand that is received by the operation device 206, and transmits an instruction type corresponding to the operation to the AV unit 340.

The AV unit 340 operates according to the instruction type received from the communication unit 320, the recognition unit 330, or the operation recognition unit 370. For example, if the instruction type received from the communication unit 320, the recognition unit 330, or the operation recognition unit 370 is "START AV", the AV unit 340 performs playback of the audiovisual data, and transmits the audiovisual playback contents to the image output unit 350 and the audio output unit 360.

When the instruction type, which is received from the communication unit 320, the recognition unit 330, or the operation recognition unit 370, is "STOP AV", the AV unit 340 stops playback of the audiovisual data.

In a case in which the instruction type is transmitted from the communication unit 320 or the recognition unit 330, the AV unit 340 generates repetition data (voice data) for repeating the instruction type, and outputs the generated repetition data through the audio output unit 360.

The image output unit 350 outputs audiovisual data (image/video data) transmitted from the AV unit 340. The audio output unit 360 outputs audiovisual data (audio data) transmitted from the AV unit 340. This allows the occupant of the vehicle to view audiovisual contents in the vehicle.

Further, the audio output unit 360 repeats the instruction type of the voice command by outputting the repetition data (voice data) transmitted from the AV unit 340. Accordingly, the occupant of the vehicle can confirm that the on-board audiovisual device 100 has recognized the instruction type of the voice command.

<Example of Words Stored in Word Information Storing Unit>

Figure 4:
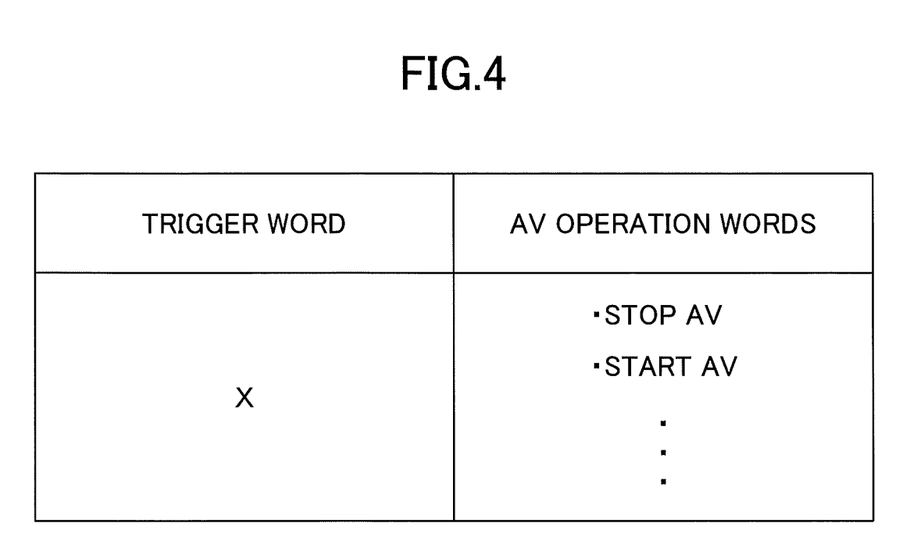
FIG. 4 is a diagram illustrating an example of various words stored in a word information storing unit.

Next, a specific example of various words stored in the word information storing unit 380 will be described. FIG. 4 is a diagram illustrating a specific example of various words stored in the word information storing unit. As illustrated in FIG. 4, in the word information storing unit 380, each word is stored by being classified into either "trigger word" or "AV operation word".

The "trigger word" is a word indicating the on-board audiovisual device 100 to be operated by a voice command. The example illustrated in FIG. 4 indicates that "X" is stored as a trigger word (practically, a product name and the like of the on-board audiovisual device 100 is stored in X).

The "AV operation word" is a word or a phrase indicating the first instruction type (such as playback or stop) for operating the on-board audiovisual device 100 to be operated by a voice command. The example illustrated in FIG. 4 indicates that at least "STOP AV" and "START AV" are stored as the AV operation words. Note that each AV operation word stored in the word information storing unit 380 is not required to be a single word. For example, as illustrated in FIG. 4, a phrase (multiple words) such as "START AV" may be used as an AV operation word. Similarly, the trigger word may be composed of multiple words (i.e. the trigger word may be a phrase).

<Speech Recognition Process>

Figure 5:
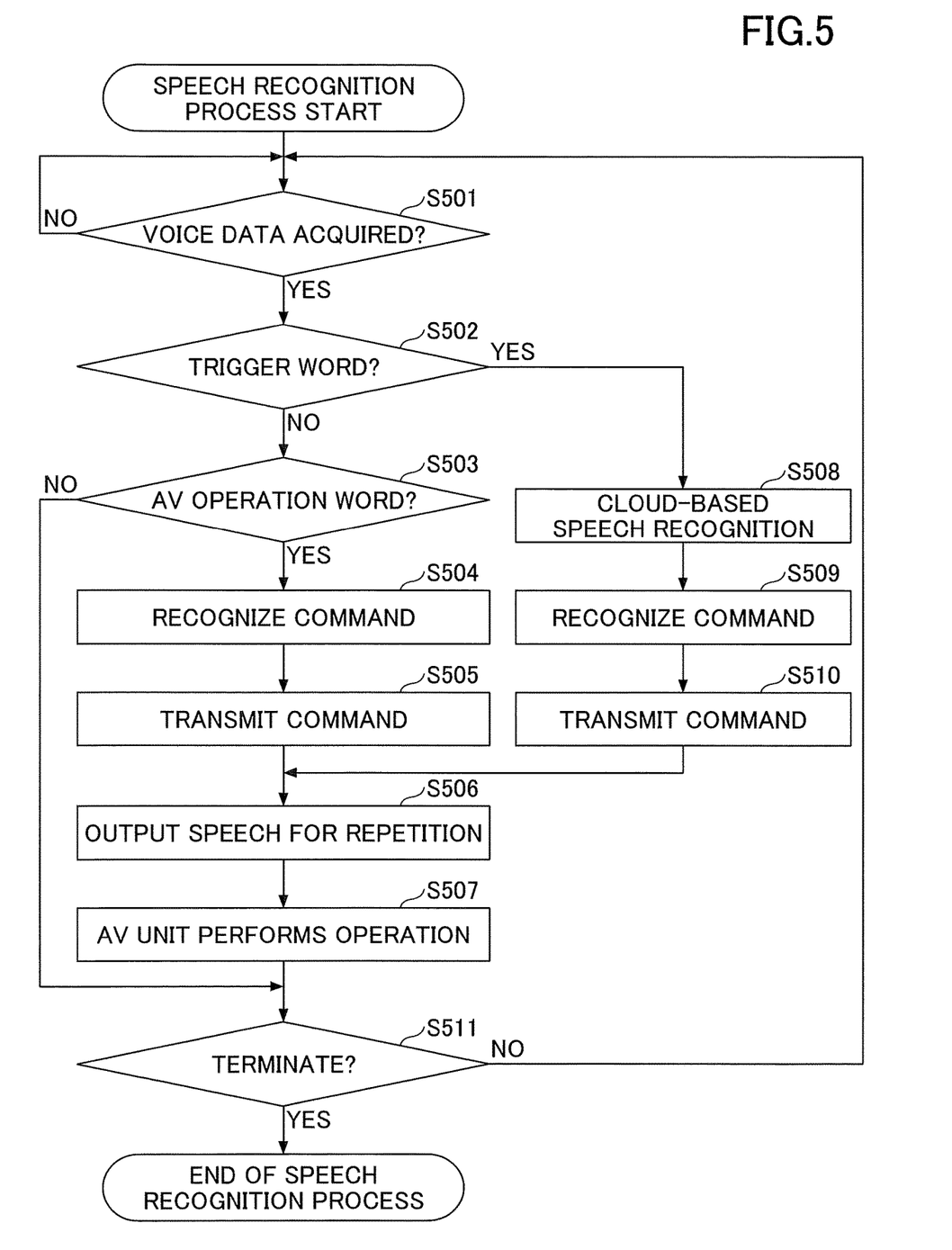
FIG. 5 is a first flowchart illustrating a flow of a speech recognition process performed by the in-vehicle audiovisual device.

Next, a flow of a speech recognition process performed by the on-board audiovisual device 100 will be described. FIG. 5 is a first flowchart illustrating the flow of the speech recognition process performed by the on-board audiovisual device.

At step S501, the voice acquisition unit 310 determines whether or not voice data is acquired from the audio input device 209. If it is determined at step S501 that voice data is not acquired (in the case of "NO" at step S501), the process waits until voice data is acquired.

In contrast, if it is determined that the voice data is acquired at step S501 (in the case of "YES" at step S501), the voice acquisition unit 310 transmits the acquired voice data to the communication unit 320 and the recognition unit 330.

At step S502, the recognition unit 330 determines whether or not the voice data received from the voice acquisition unit 310 is a trigger word. Specifically, the recognition unit 330 determines whether or not a word (or words) detected, by speech recognition, from the voice data received from the voice acquisition unit 310 matches the "trigger word" stored in the word information storing unit 380.

If it is determined, at step S502, that the voice data is the trigger word (when "YES" at step S502), the recognition unit 330 transmits an operation instruction for executing the cloud-based voice recognition function to the communication unit 320, and the process proceeds to step S508.

At step S508, when the communication unit 320 receives an operation instruction from the recognition unit 330 for operating the cloud-type voice recognition function, the communication unit 320 transmits voice data of a predetermined length that is received from the voice acquisition unit 310 (after the receiving of the operation instruction for operating the cloud-type voice recognition function), to the cloud computing platform on the network. By performing step S508, in the cloud computing platform, the received voice data of the predetermined length is translated, by speech recognition, to an instruction type (result of speech recognition).

At step S509, the communication unit 320 receives the result of speech recognition (instruction type) from the cloud computing platform on the network in response to transmitting the voice data, and recognizes the instruction type of a voice command. By recognizing the instruction type of a voice command, the communication unit 320 can specify an instruction corresponding to the instruction type, which is to be transmitted to the AV unit 340.

At step S510, the communication unit 320 transmits the recognized instruction type to the AV unit 340. For example, the communication unit 320 transmits, as the recognized instruction type, the specified instruction corresponding to the instruction type to the AV unit 340.

Meanwhile, if it is determined at step S502 that the voice data is not a trigger word (in the case of "NO" at step S502), the process proceeds to step S503. At step S503, the recognition unit 330 determines whether or not the voice data received from the voice acquisition unit 310 is an AV operation word. Specifically, the recognition unit 330 determines whether or not a word (or words) detected (by speech recognition) from the voice data received from the voice acquisition unit 310 matches any one of the "AV operation words" stored in the word information storing unit 380.

If it is determined at step S503 that the voice data is not an AV operation word (in the case of "NO" at step S503), the process proceeds to step S511. In contrast, if it is determined at step S503 that the voice data is an AV operation word (in the case of "YES" at step S503), the process proceeds to step S504.

At step S504, the recognition unit 330 recognizes an instruction type of a voice command (AV operation word determined at step S503). By recognizing the instruction type of a voice command, the recognition unit 330 can specify an instruction corresponding to the instruction type, which is to be transmitted to the AV unit 340. At step S505, the recognition unit 330 transmits the recognized instruction type to the AV unit 340. For example, the recognition unit 330 transmits, as the recognized instruction type, the specified instruction corresponding to the instruction type to the AV unit 340.

At step S506, the AV unit 340 generates repetition data (voice data) for repeating the instruction type transmitted from the communication unit 320 or the recognition unit 330, and outputs, as voice; the generated repetition data through the audio output unit 360.

At step S507, the AV unit 340 performs an operation according to the instruction type transmitted from either the communication unit 320 or the recognition unit 330.

At step S511, the voice acquisition unit 310 determines whether or not to terminate the speech recognition process. If it is determined at step S511 that the speech recognition process is not terminated (in the case of "NO" at step S511), the process reverts to step S501. Meanwhile, if the voice acquisition unit 310 determines, at step S511, to terminate the speech recognition process, the speech recognition process terminates.

As described above, in the on-board audiovisual device 100 according to the present embodiment, in addition to a word that is recognized by speech recognition on condition of being spoken after a trigger word, provision is made for a word (AV operation word) that is recognized by speech recognition even if not following a trigger word. Thus, in the on-board audiovisual device 100 according to the present embodiment, an occupant (such as an occupant 610 in FIG. 6B) of the vehicle can operate the on-board audiovisual device 100 by issuing a voice command with respect to the first instruction type (such as playback or stop), without speaking a trigger word.

<Example of Operation of On-Board Audiovisual Device>

Figure 6A:
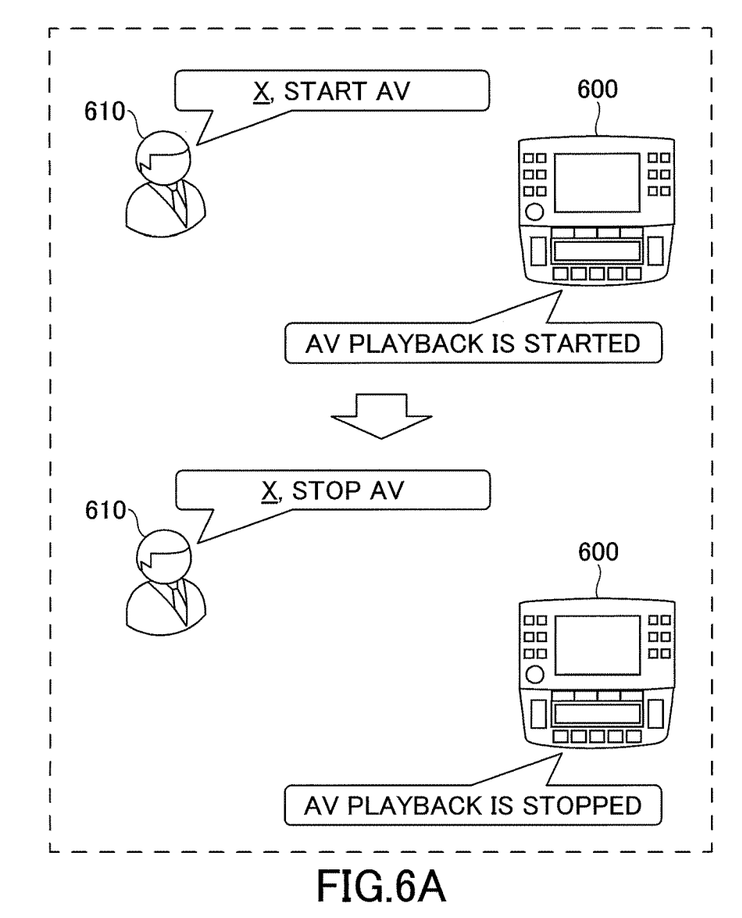
FIGS. 6A and 6B are diagrams illustrating examples of operations of the in-vehicle audiovisual device.
Figure 6B:
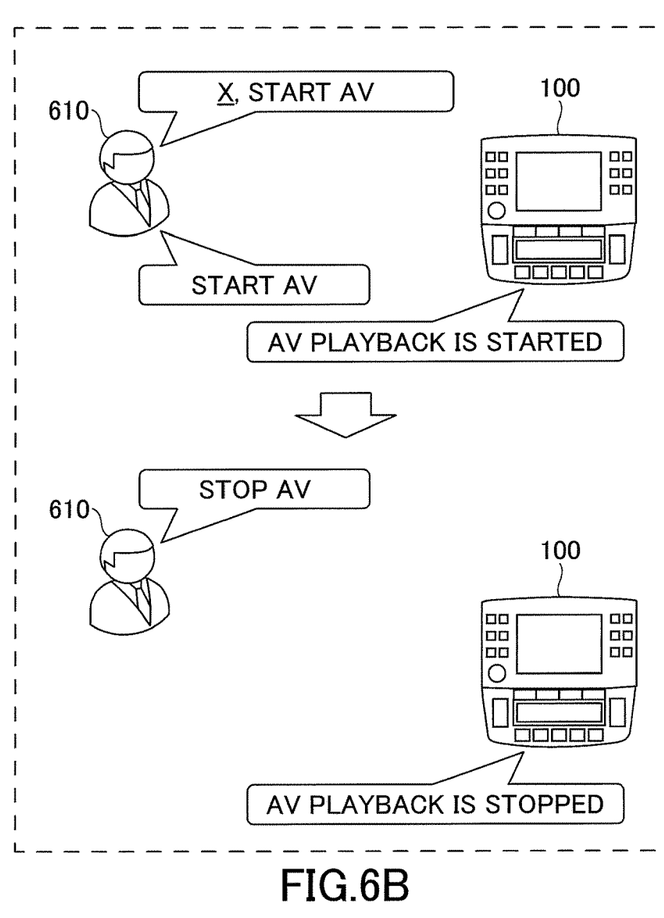

Next, an example of an operation of the on-board audiovisual device 100 will be described. FIGS. 6A and 6B are a first set of diagrams illustrating an example of the operation of the on-board audiovisual device. FIG. 6A illustrates, as a comparative example, an example of an operation of a general on-board audiovisual device 600.

As illustrated in FIG. 6A, every time before issuing a voice command ("START AV" or "STOP AV") to the general on-board audiovisual device 600, the occupant 610 needs to speak a trigger word ("X" (underlined portion in FIG. 6A)).

In contrast, FIG. 6B illustrates an example of the operation of the on-board audiovisual device 100 according to the present embodiment. As illustrated in FIG. 6B, when an occupant 610 issues a voice command to the on-board audiovisual device 100, the occupant 610 may speak a trigger word, but does not need to speak the trigger word if the voice command is the first instruction type.

For example, as illustrated in the upper part of FIG. 6B, if a trigger word ("X" (underlined portion in FIG. 6B)) is spoken before issuing a voice command ("START AV"), the trigger word is recognized, by a speech recognition process performed by the recognition unit 330, similar to the comparative example. Also, the voice command ("START AV") following the trigger word is recognized, by a speech recognition process executed in the cloud computing platform. By the operations being performed, the AV unit 340 plays back audiovisual data.

In contrast, as illustrated in the lower part of FIG. 6B, in a case in which the occupant 610 does not speak the trigger word ("X") before issuing the voice command ("STOP AV"), the voice command is recognized as AV operation words ("STOP AV"), by a speech recognition process performed by the recognition unit 330. Accordingly, the AV unit 340 stops playback of audiovisual data.

As described above, because the on-board audiovisual device 100 recognizes an AV operation word by speech recognition, regardless of whether a trigger word is spoken or not, the occupant 610 of the vehicle can operate the AV unit 340 without speaking the trigger word. As a result, according to the on-board audiovisual device 100, the occupant 610 of the vehicle can avoid a situation in which the occupant 610 must speak a trigger word each time the occupant 610 issues a voice command. That is, it is possible to improve convenience of the occupant 610 of the vehicle when issuing a voice command to the on-board audiovisual device 100.

Summary

As is obvious from the above description, the on-board audiovisual device according to the first embodiment includes the following features.

The word information storing unit stores a word (AV operation word) indicating a first instruction type for operating the on-board audiovisual device, in addition to a word (trigger word) indicating the on-board audiovisual device.

When voice data is received, it is determined whether the voice data matches either the trigger word or the AV operation word.

If it is determined that the voice data matches the trigger word, the on-board audiovisual device causes the cloud computing platform to perform speech recognition of voice data following the trigger word, and an instruction type (second instruction type) recognized as a result of the speech recognition is transmitted to the AV unit.

If it is determined that the voice data does not match the trigger word and that the voice data matches the AV operation word, an instruction type (first instruction type) corresponding to the AV operation word is transmitted to the AV unit.

That is, the on-board audiovisual device according to the first embodiment recognizes an AV operation word by speech recognition, regardless of whether a trigger word is spoken or not.

Therefore, in the on-board audiovisual device according to the first embodiment, it is possible to avoid a situation in which a trigger word must be spoken each time a voice command is to be issued, and to issue a voice command with respect to the first instruction type without speaking a trigger word. As a result, it is possible to improve convenience of a user who issues a voice command to the on-board audiovisual device.

Second Embodiment

The above-described first embodiment describes a case in which the recognition unit 330 is configured to recognize two types of words, a trigger word and an AV operation word, at all times by speech recognition, regardless of a situation in a compartment of a vehicle. However, instead of recognizing the two types of words at all times, the recognition unit 330 may be configured to recognize only the trigger word by speech recognition, depending on a situation in a compartment of a vehicle.

Suppose a case in which multiple occupants are on board a vehicle and they are making conversations with each other in a compartment of the vehicle. If a word corresponding to an AV operation word is spoken accidentally, the on-board audiovisual device 100 mistakenly recognizes the word corresponding to an AV operation word as a voice command to be issued to the on-board audiovisual device 100, and performs an operation according to the first instruction type.

Accordingly, in a second embodiment, in a case in which multiple occupants are on board a vehicle and the possibility of misrecognizing a word corresponding to an AV operation word as a voice command is increased, an on-board audiovisual device according to the second embodiment switches a mode of a recognition unit to a mode in which only a trigger word is recognized by speech recognition. This reduces the possibility of misrecognizing a word corresponding to an AV operation word as a voice command issued to the on-board audiovisual device 100. Hereinafter, the second embodiment will be described, and especially, a difference from the above-described first embodiment will be mainly described.

<Functional configuration of On-Board Audiovisual Device>

Figure 7:
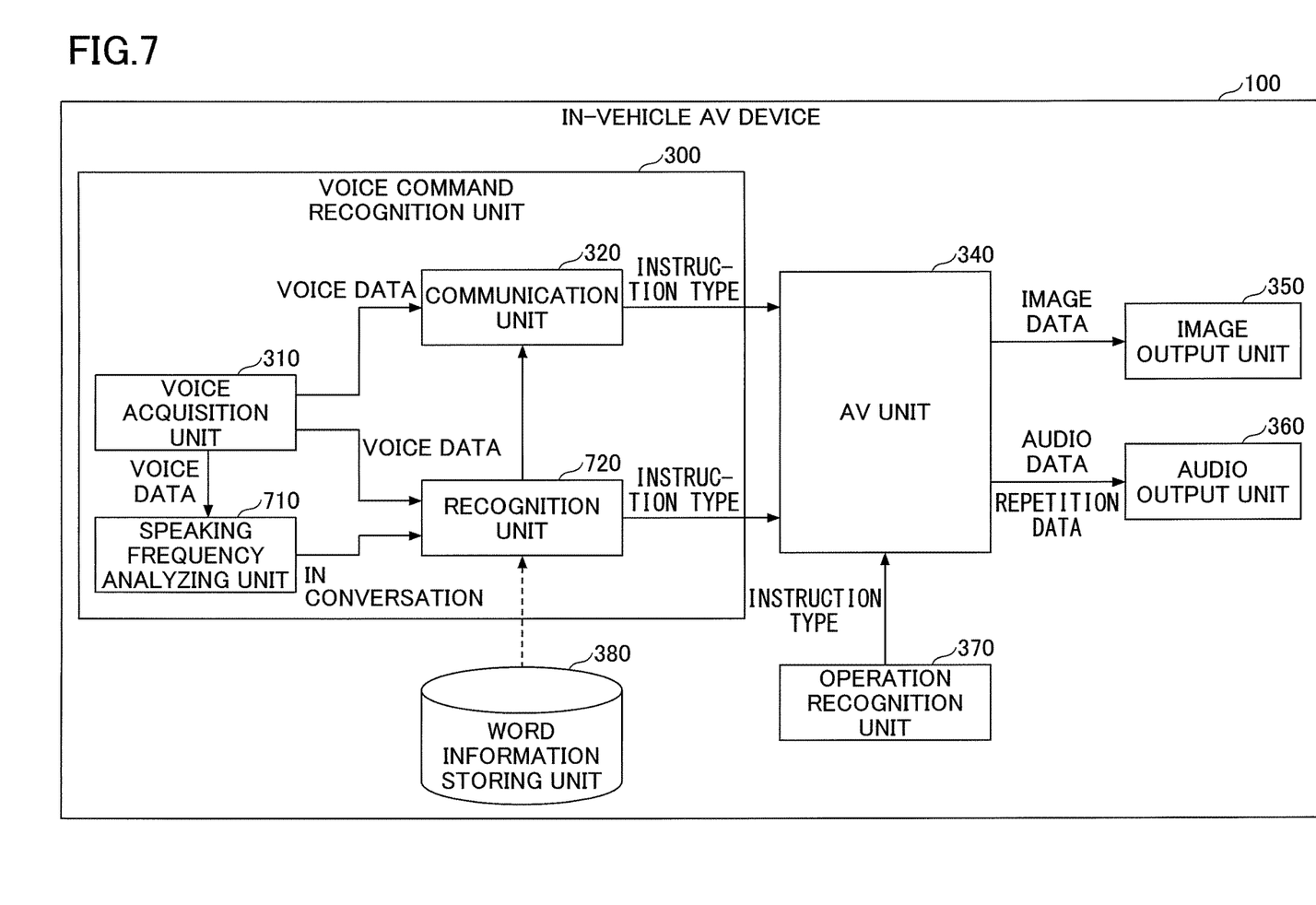
FIG. 7 is a second diagram illustrating an example of the functional configuration of the in-vehicle audiovisual device.

First, a functional configuration of the on-board audiovisual device according to the second embodiment will be described. FIG. 7 is a second diagram illustrating an example of a functional configuration of the on-board audiovisual device. The difference from FIG. 3 is a speaking frequency analyzing unit 710 and a recognition unit 720.

The speaking frequency analyzing unit 710 analyzes speaking frequency (frequency of speech) of an occupant(s) based on voice data acquired by the voice acquisition unit 310. If the speaking frequency is equal to or greater than a predetermined threshold, the speaking frequency analyzing unit 710 determines that multiple occupants are in a compartment of a vehicle and that the multiple occupants are in conversation. Further, when the speaking frequency analyzing unit 710 determines that the multiple occupants are in conversation, the speaking frequency analyzing unit 710 transmits, to the recognition unit 720, information indicating that conversation is in progress.

The recognition unit 720 reads out words stored in the word information storing unit 380, and the recognition unit 720 recognizes, by speech recognition, a word corresponding to the words that have been read out from the word information storing unit 380, from the voice data transmitted from the voice acquisition unit 310. Here, while the information indicating that conversation is in progress is transmitted from the speaking frequency analysis unit 710, the recognition unit 720 treats only a "trigger word" as a target for speech recognition, among the words read out from the word information storing unit 380. In contrast, when information indicating that conversation is in progress is not transmitted from the speaking frequency analyzing unit 710, the recognition unit 720 treats both the "trigger word" and an "AV operation word" that have been read out from the word information storing unit 380 as targets for speech recognition.

<Speech Recognition Process>

Figure 8:
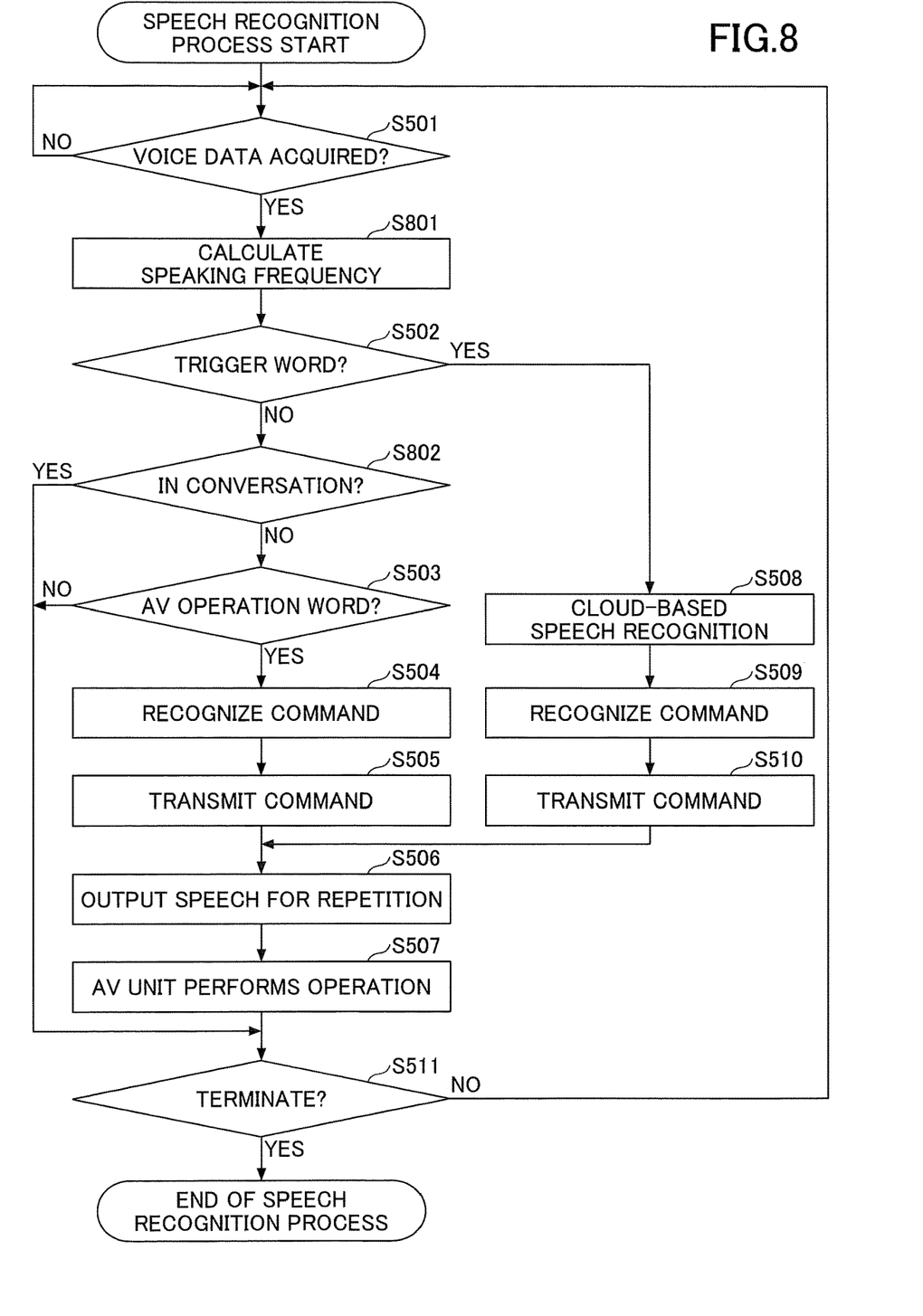
FIG. 8 is a second flowchart illustrating a flow of the speech recognition process performed by the in-vehicle audiovisual device.

Next, a flow of a voice recognition process performed by the on-board audiovisual device 100 according to the second embodiment will be described. FIG. 8 is a second flowchart illustrating the flow of the speech recognition process. Differences from the speech recognition process described with reference to FIG. 5 are in steps S801 and S802.

At step S801, the speaking frequency analyzing unit 710 calculates speaking frequency of an occupant, and if the calculated speaking frequency is equal to or greater than a predetermined threshold, the speaking frequency analyzing unit 710 determines that multiple occupants are on board in the vehicle compartment and that the multiple occupants are in conversation. In addition, the speaking frequency analyzing unit 710 transmits, to the recognition unit 720, information indicating that the multiple occupants are in conversation.

At step S802, the recognition unit 720 determines whether or not information indicating that conversation is in progress has been transmitted from the speaking frequency analyzing unit 710, in order to determine whether or not the occupants in the vehicle are in conversation.

If it is determined that conversation is in progress (in the case of "YES" at step S802), the process proceeds to step S511. Meanwhile, if it is determined at step S802 that conversation is not in progress, the process proceeds to step S503. As the subsequent processes have been described with reference to FIG. 5, the description of these processes will be omitted here.

<Example of Operation of On-Board Audiovisual Device>

Next, an example of the operation of the on-board audiovisual device 100 will be described.

Figure 9A:
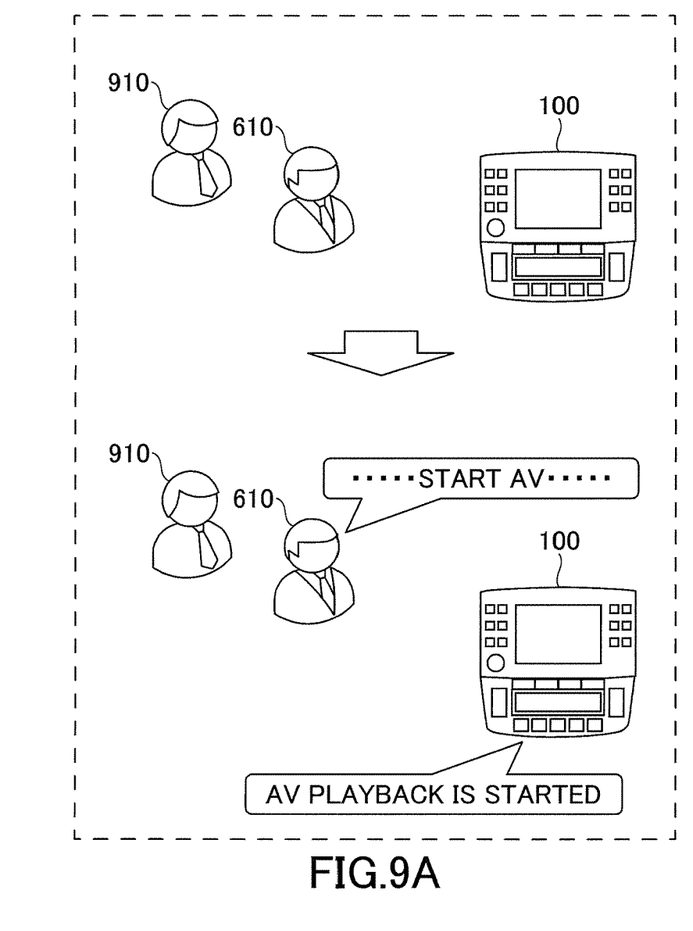
FIGS. 9A and 9B are diagrams illustrating examples of operations of the in-vehicle audiovisual device.
Figure 9B:
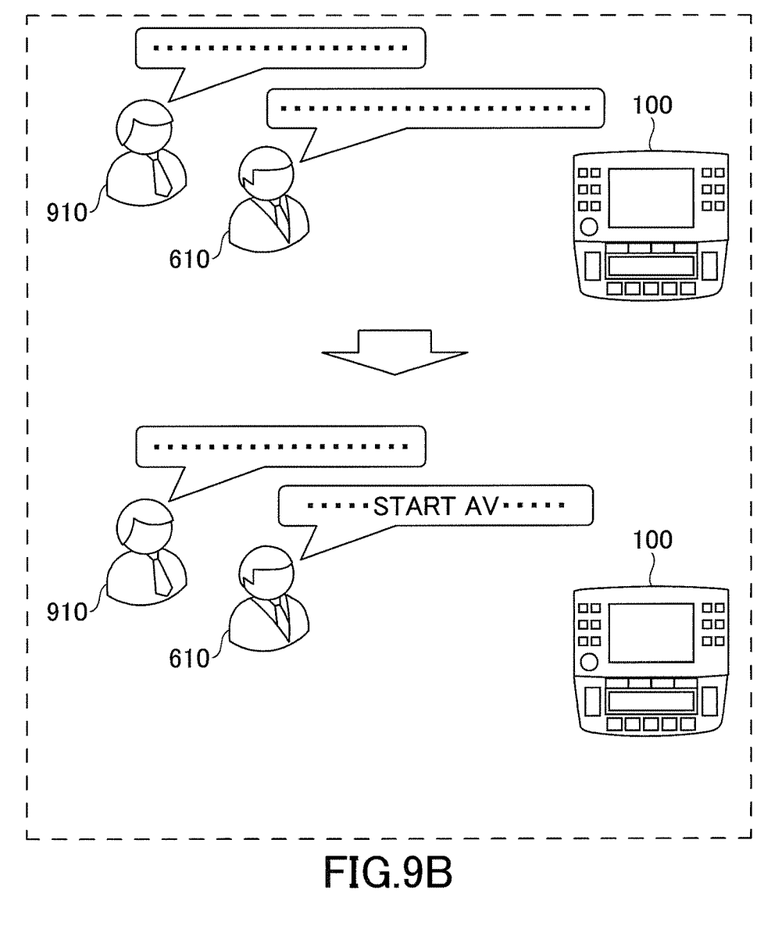

FIGS. 9A and 9B are a second set of diagrams illustrating an example of an operation of the on-board audiovisual device. FIG. 9A illustrates, as a comparative example, a case in which one occupant is in a vehicle, or in which multiple occupants are in a vehicle but are not talking with each other.

As illustrated in FIG. 9A, if the occupants 610 and 910 in the vehicle are not talking with each other, the recognition unit 720 recognizes two types of words by speech recognition: a trigger word and an AV operation word. Accordingly, for example, if an AV operation word is included in the speech spoken by the occupant 610 in the vehicle, the AV operation word is recognized. In this case, the occupant 610 may issue voice commands without speaking a trigger word, as in the first embodiment.

In contrast, as illustrated in FIG. 9B, in a case in which the occupants 610 and 910 in the vehicle are talking with each other, the recognition unit 720 recognizes only a trigger word. Accordingly, even if a word equivalent to an AV operation word appears in the speech spoken by the occupants in the vehicle, the word in the speech is not recognized (in other words, the on-board audiovisual device 100 will not operate in accordance with a word equivalent to an AV operation word in the speech). As a result, it is possible to avoid a situation in which a word equivalent to an AV operation word is mistakenly recognized as a voice command issued to the on-board audiovisual device 100.

Summary

As is obvious from the above description, in the on-board audiovisual device according to the second embodiment includes the following features.

The word information storing unit stores a word (AV operation word) indicating the first instruction type for operating the on-board audiovisual device, in addition to a word (trigger word) indicating the on-board audiovisual device.

When acquiring voice data, whether or not occupants in the vehicle are in conversation is determined, by calculating speaking frequency of the occupants in the vehicle.

If it is determined that the occupants in the vehicle are in conversation, among words (trigger word and AV operation word) stored in the word information storing unit, only the trigger word is recognized by speech recognition.

In contrast, if it is determined that the occupants in the vehicle are not in conversation, both the trigger word and the AV operation word stored in the word information storing unit are treated as targets for speech recognition.

Accordingly, in the on-board audiovisual device according to the second embodiment, even if a word equivalent to an AV operation word is spoken during conversation with occupants in a vehicle, a situation in which the word is misrecognized as a voice construction can be avoided.

Other Embodiments

In the first and second embodiments described above, a case in which only one trigger word is stored in the word information storing unit 380 has been described. However, multiple trigger words may be stored. Further, in the first and second embodiments, although "STOP AV" and "START AV" have been illustrated as AV operation words stored in the word information storing unit 380, other words for operating audiovisual equipment may be stored in the word information storing unit 380.

Further, the aforementioned second embodiment has described a case in which the recognition unit 720 recognizes only a trigger word by speech recognition while information indicating that conversation is in progress is received from the speaking frequency analyzing unit 710. However, the recognition unit 720 may be configured to recognize a trigger word and part of AV operation words, by speech recognition. That is, while receiving information indicating that conversation is in progress, by narrowing down AV operation words stored in the word information storing unit 380, a part of the AV operation words may be recognized by speech recognition.

Further, in the first and second embodiments described above, a target to which a voice command is issued is an on-board audiovisual device, but the target is not limited to the on-board audiovisual device. Other in-vehicle devices may be a target to which a voice command is issued.

The present invention is not limited to the configurations described in the above-described embodiments. Configurations can be modified without departing from the spirit of the present invention, and can be suitably defined according to application form.

What is claimed is:

1. An in-vehicle device comprising:
a first speech recognition unit configured to recognize a word indicating the in-vehicle device and a word indicating a first instruction type by speech recognition, from first voice data input to the in-vehicle device, the first instruction type including an instruction for operating the in-vehicle device as an object of a speech instruction; and
a second speech recognition unit configured, in response to the word indicating the in-vehicle device being recognized, from the first voice data by the first speech recognition unit, to recognize a word indicating a second instruction type by speech recognition, from second voice data input to the in-vehicle device, the second voice data being input after the first voice data, and the second instruction type including an instruction for operating the in-vehicle device that is recognized after the word indicating the in-device device is recognized; wherein the first speech recognition unit is configured to recognize the word indicating the first instruction type, regardless of whether or not the word indicating the in-vehicle device is recognized from the first voice data by the first speech recognition unit,
wherein the first speech recognition unit is configured, in response to determination that a speaking frequency calculated based on third voice data input to the in-vehicle device is equal to or greater than a predetermined threshold,
to retrieve the word indicating the in-vehicle device from the storage unit, and
to determine whether or not fourth voice data that is input after the third voice data matches the word indicating the in-vehicle device that is retrieved from the storage unit.

2. The in-vehicle device according to claim 1, further comprising a storage unit configured to store the word indicating the in-vehicle device and the word indicating the first instruction type; wherein the first speech recognition unit is configured to perform speech recognition by retrieving a word stored in the storage unit and by determining whether or not the first voice data matches the word that is retrieved from the storage unit.

3. A method of speech recognition performed by an in-vehicle device, the method comprising:
determining, by speech recognition, whether or not a word indicating the in-vehicle device is included in first voice data that is input to the in-vehicle device;
in response to the determination that the word indicating, the in-vehicle device is not included in the first voice data, determining whether or not a word indicating a first instruction type is included in the first voice data by speech recognition, the first instruction type including an instruction for operating the in-vehicle device as an object of a speech instruction, and causing the in-vehicle device to operate in accordance with the first instruction type, in response to the determination that the word indicating the first instruction type is included in the first voice data; and
in response to the determination that the word indicating the in-vehicle device is included in the first voice data, determining, by speech recognition, whether or not a word indicating a second instruction type is included in second voice data that is input to the in-vehicle device after the first voice data, the second instruction type including an instruction for operating the in-vehicle device that is recognized after the word indicating the in-device device is recognized,
wherein the method further includes, in response to determination that a speaking frequency calculated based on third voice data input to the in-vehicle device is equal to or greater than a predetermined threshold,
retrieving the word indicating the in-vehicle device from the storage unit, and
determining whether or not fourth voice data that is input after the third voice data matches the word indicating the in-vehicle device that is retrieved from the storage unit.

* * * * *